(12) United States Patent
Law

(10) Patent No.: US 8,152,101 B2
(45) Date of Patent: Apr. 10, 2012

(54) SYSTEM AND METHOD FOR INTEGRATING HANDICAPPED ACCESSIBLE SEATS INTO AIRCRAFT INTERIOR CONFIGURATIONS

(76) Inventor: Sondra F. Law, San Francisco, CA (US)

( * ) Notice: Subject to any disclaimer, the term of this patent is extended or adjusted under 35 U.S.C. 154(b) by 316 days.

(21) Appl. No.: 12/440,857

(22) PCT Filed: Sep. 12, 2007

(86) PCT No.: PCT/US2007/019758
§ 371 (c)(1),
(2), (4) Date: Mar. 11, 2009

(87) PCT Pub. No.: WO2008/033360
PCT Pub. Date: Mar. 20, 2008

(65) Prior Publication Data
US 2010/0051746 A1 Mar. 4, 2010

Related U.S. Application Data

(60) Provisional application No. 60/843,896, filed on Sep. 12, 2006, provisional application No. 60/851,350, filed on Oct. 11, 2006.

(51) Int. Cl.
*B64D 11/00* (2006.01)

(52) U.S. Cl. ............... 244/118.5; 244/118.6; 296/65.04; 280/250.1

(58) Field of Classification Search ............... 244/118.5, 244/118.6; 296/65.04; 280/250.1
See application file for complete search history.

(56) References Cited

U.S. PATENT DOCUMENTS

| | | | |
|---|---|---|---|
| 3,189,313 A | 6/1965 | Burns et al. |
| 3,570,415 A | 3/1971 | Drinnon et al. |
| 3,620,171 A | 11/1971 | Brenia et al. |
| 3,652,050 A | 3/1972 | Marrujo et al. |
| 3,677,195 A | 7/1972 | Prete, Jr. |
| 3,955,847 A | 5/1976 | Schiowitz |
| 4,026,218 A | 5/1977 | Prete, Jr. et al. |
| 4,062,298 A | 12/1977 | Weik |
| 4,098,521 A | 7/1978 | Ferguson et al. |
| 4,109,891 A | 8/1978 | Grendahl |
| 4,114,947 A | 9/1978 | Nelson |
| 4,164,354 A | 8/1979 | Rodaway |

(Continued)

OTHER PUBLICATIONS

Law, Sondra F., "Accessible Aircraft Seating System", IDOnline.com—The International Design Magazine-Graphic Design, Product Design, Architecture; http://www.idonline.com/sdr06/hm.asp, printed Oct. 9, 2006.

(Continued)

*Primary Examiner* — J. Woodrow Eldred
(74) *Attorney, Agent, or Firm* — Pearl Cohen Zedek Latzer, LLP

(57) ABSTRACT

A handicapped accessible seat that classifies functionally as an aircraft seat is configured for maneuvering within an aircraft and docking to an aircraft floor using a typical track member having a longitudinal flange like extension and counterbores for mating with a shear plug of an aircraft seat. A bracket or track above the typical track member and containing inwardly-extending longitudinal flanges allows mating association with a plug or plunger on the wheel/caster or bottom seat structure of the handicapped accessible seat (94). A flange-like extension along the bottom portion of the track, having a planar portion along the floor of the aircraft and an outer, upward portion, could run the entire length of an aircraft or in only specific portions thereof and may also be used to guide the wheels into a locking position.

18 Claims, 15 Drawing Sheets

U.S. PATENT DOCUMENTS

| | | |
|---|---|---|
| 4,184,656 A | 1/1980 | Wakeley |
| 4,213,593 A | 7/1980 | Weik |
| 4,229,040 A | 10/1980 | Howell et al. |
| 4,234,278 A | 11/1980 | Harshman et al. |
| 4,266,305 A | 5/1981 | Kavaloski et al. |
| 4,277,043 A | 7/1981 | Weik |
| 4,278,387 A | 7/1981 | Seguela et al. |
| 4,354,791 A | 10/1982 | Antonellis |
| 4,375,300 A | 3/1983 | Long et al. |
| 4,396,175 A | 8/1983 | Long et al. |
| 4,440,443 A | 4/1984 | Nordskog |
| 4,492,403 A | 1/1985 | Blomgren et al. |
| 4,493,470 A | 1/1985 | Engel |
| 4,509,888 A | 4/1985 | Sheek |
| 4,526,421 A * | 7/1985 | Brennan et al. ............ 297/232 |
| 4,598,921 A | 7/1986 | Fenwick |
| 4,600,239 A | 7/1986 | Gerstein et al. |
| 4,688,843 A | 8/1987 | Hall |
| 4,708,549 A | 11/1987 | Jensen |
| 4,718,719 A | 1/1988 | Brennan |
| 4,729,573 A | 3/1988 | Davis |
| 4,730,964 A | 3/1988 | Joyner |
| 4,770,432 A | 9/1988 | Wagner |
| 4,772,164 A | 9/1988 | McFarland |
| 4,776,533 A | 10/1988 | Sheek et al. |
| 4,874,203 A | 10/1989 | Henley |
| 4,911,381 A | 3/1990 | Cannon et al. |
| 5,026,225 A | 6/1991 | McIntyre |
| 5,069,505 A | 12/1991 | Amthor et al. |
| 5,074,574 A | 12/1991 | Carwin |
| 5,186,585 A | 2/1993 | Sousa et al. |
| 5,337,979 A | 8/1994 | Bales et al. |
| 5,344,265 A | 9/1994 | Ullman et al. |
| 5,378,041 A | 1/1995 | Lee |
| 5,489,170 A | 2/1996 | Inoue et al. |
| 5,567,016 A | 10/1996 | Koprowski |
| 5,573,261 A | 11/1996 | Miller |
| 5,628,595 A | 5/1997 | Harris |
| 5,669,620 A | 9/1997 | Robbins |
| 5,727,845 A | 3/1998 | Jackson-Wynch |
| 5,738,306 A | 4/1998 | Moss et al. |
| 5,769,360 A | 6/1998 | Kerbis et al. |
| 5,785,277 A | 7/1998 | Manning et al. |
| 5,823,727 A | 10/1998 | Lee |
| 5,888,038 A | 3/1999 | Ditch et al. |
| 5,975,822 A | 11/1999 | Ruff |
| 6,012,679 A | 1/2000 | Auestad |
| 6,116,561 A | 9/2000 | Cristopher |
| 6,193,453 B1 | 2/2001 | Kernkamp |
| 6,260,813 B1 | 7/2001 | Whitcomb |
| 6,510,567 B1 | 1/2003 | Robbins |
| 6,540,250 B1 | 4/2003 | Peterson |
| 6,644,738 B2 | 11/2003 | Williamson |
| 6,659,402 B1 | 12/2003 | Prochaska |
| 6,728,991 B2 | 5/2004 | Lai et al. |
| 6,733,080 B2 | 5/2004 | Sayers et al. |
| 6,764,137 B2 | 7/2004 | Menard |
| 6,776,455 B2 | 8/2004 | Longtin et al. |
| 6,814,331 B2 | 11/2004 | Hessling |
| 6,839,938 B2 | 1/2005 | Kausemann |
| 6,902,238 B1 | 6/2005 | Abt et al. |
| 6,918,722 B1 | 7/2005 | Girardin |
| 6,929,100 B2 | 8/2005 | Tanksley et al. |
| 6,932,297 B1 | 8/2005 | Steindl et al. |
| 6,938,957 B2 | 9/2005 | Beatty et al. |
| 7,004,542 B2 | 2/2006 | Saint-Jalmes |
| 7,021,596 B2 | 4/2006 | Lory |
| 7,093,895 B2 | 8/2006 | Frey |
| 7,100,242 B2 | 9/2006 | Maierholzner |
| 7,100,885 B2 | 9/2006 | Zerner |
| 2007/0063122 A1 | 3/2007 | Bowd et al. |

OTHER PUBLICATIONS

"RAM Provides Passenger Services to Express Jet", http://www,intiram.com, printed Aug. 13, 2007.

Pedersen, Martin C., "The Friendlier Skies", Metropolis Magazine, http://www.metropolismagazine.com/cda/story.php?artid=1538, posted Sep. 19, 2005.

"And the Winner Is", Metropolis Magazine, http://www.metropolismag.com/cda/story.php?artid=1936, posted Apr. 26, 2006.

Law, Sondra F., "Universal Design and Air Travel", Product Design Thesis, http://productdesign.parsons.edu/html/studentworks_html/Thesis/2005/26.html, printed Oct. 9, 2006.

2006 Student Design Review Honorable Mention, The International Design Magazine I.D., http://www.id-mag.com/article/2006_Student_Design_Review_Honorable_Mention, Feb. 19, 2008.

Currey, Mason, "Making Their Mark: The runners-up in this years Next Generation Design Competition aim to build a better world", Metropolis Magazine, http://www.metropolismag.com/story/20060619/making-their-mark, pp. 1-13, Jun. 19, 2006.

Parsons 2005-2006 Undergraduate Programs Catalog.

Pederson, Martin, "The Friendlier Skies", Metropolis Magazine, pp. 120-121, Oct. 2005.

Currey, Mason, "Making Their Mark: The runners-up in this years Next Generation Design Competition aim to build a better world", Metropolis Magazine, pp. 154-155, Jul. 2006.

2006 Student Design Review Honorable Mention, The International Design Magazine I.D., pp. 90, Sep./Oct. 2006.

Letter, 2006 Student Design Review Winner was Misunderstood, The International Design Magazine I.D., pp. 10, Nov. 2006.

United States Architectural and Transportation Barriers Compliance Board, "Guidelines for Aircraft Boarding Chairs", provided by the American Institute for Research, 1996.

U.S. Department of Transportation, 14 CFR Part 382: Nondiscrimination on the Basis of Disability in Air Travel, Jul. 2003.

Leotta, Joan, "Flying High, Strong and Safe the Delta Chair Improves Travel Experience for People with Disabilities", NSCIA E-New (Electronic Newsletter of the National Spinal Cord Injury Association), Sep. 2003, http://www.spinalcord.org/enews/September2003/index.php.

International Search Report for International Application No. PCT/US2007/019758.

* cited by examiner

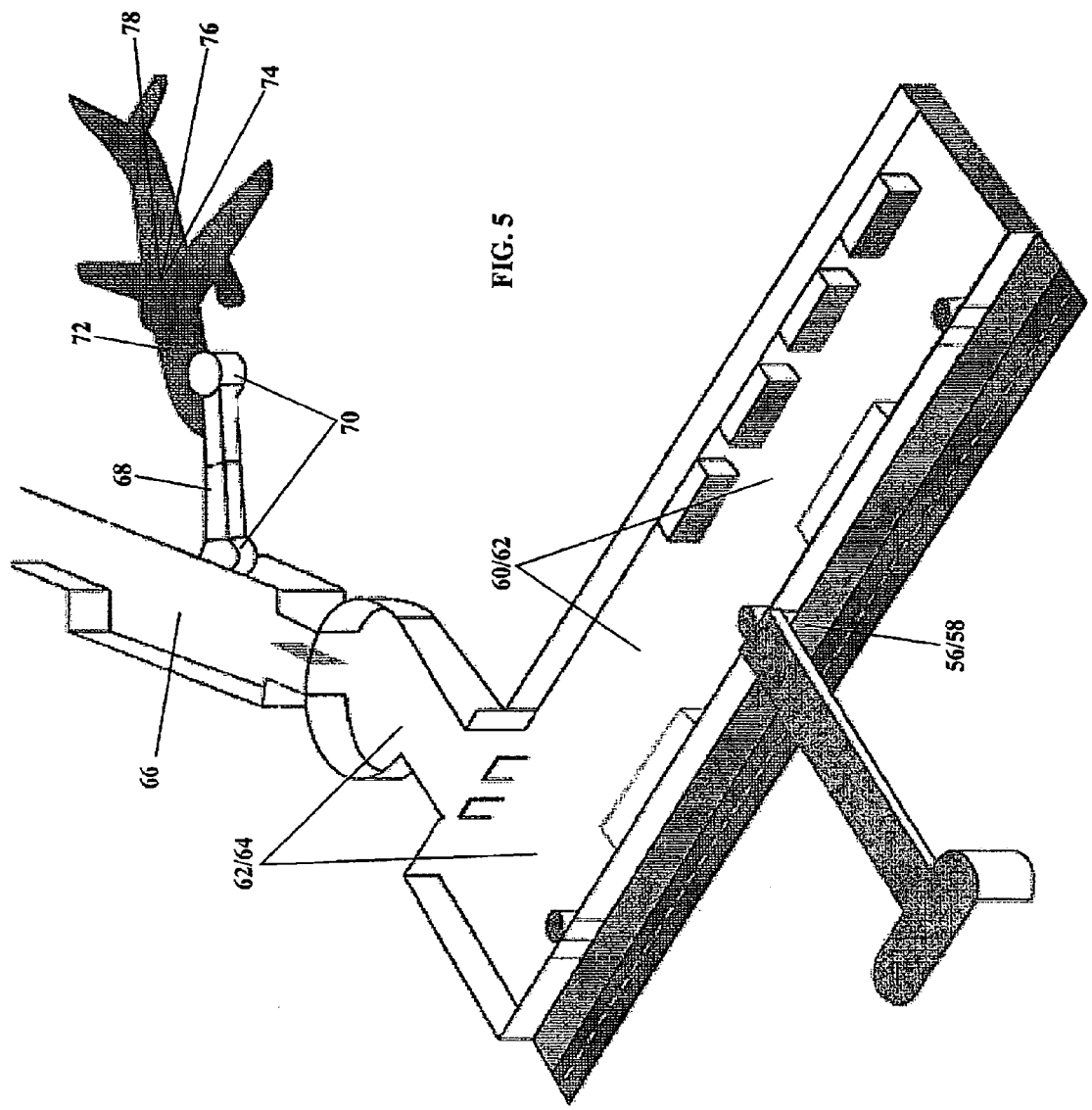

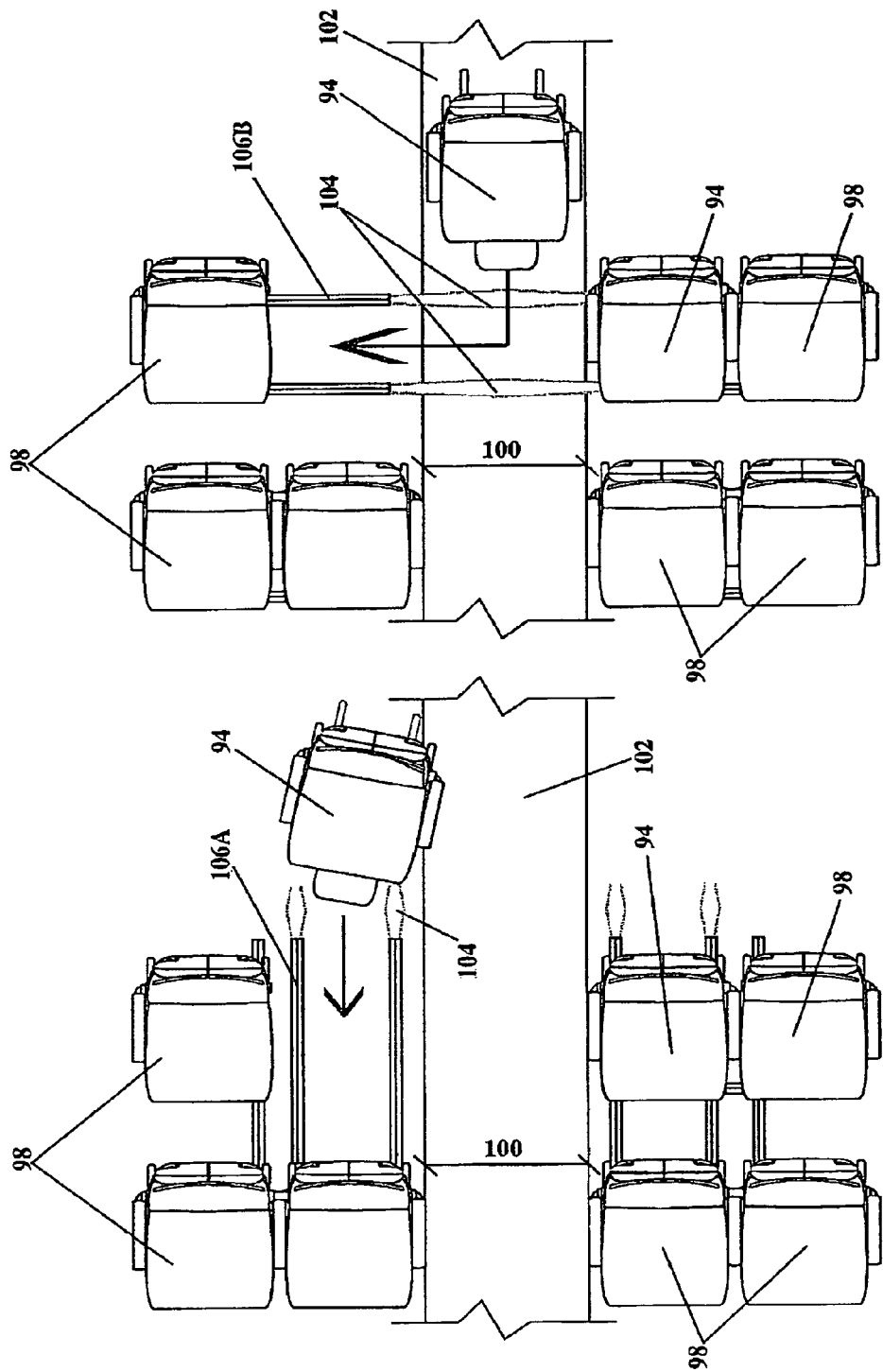

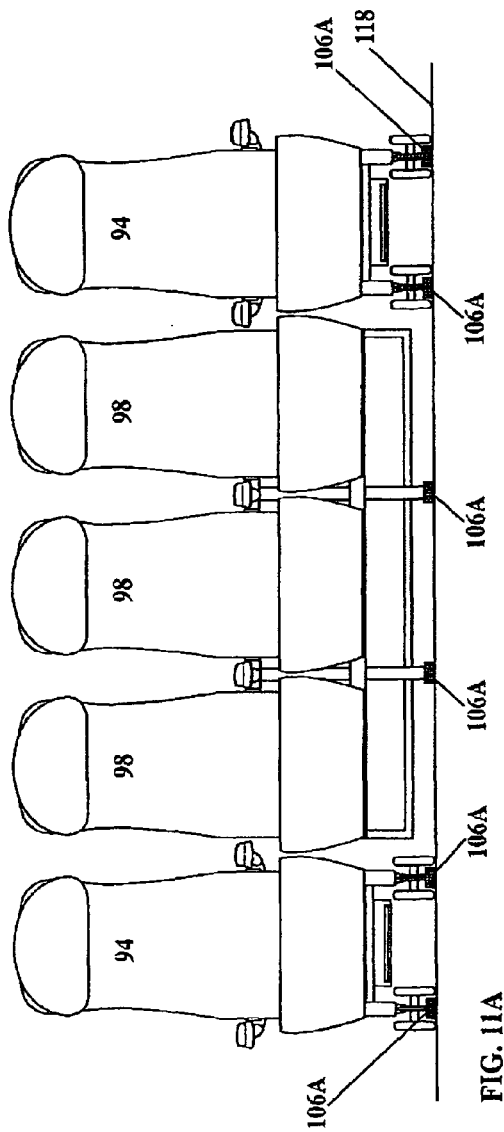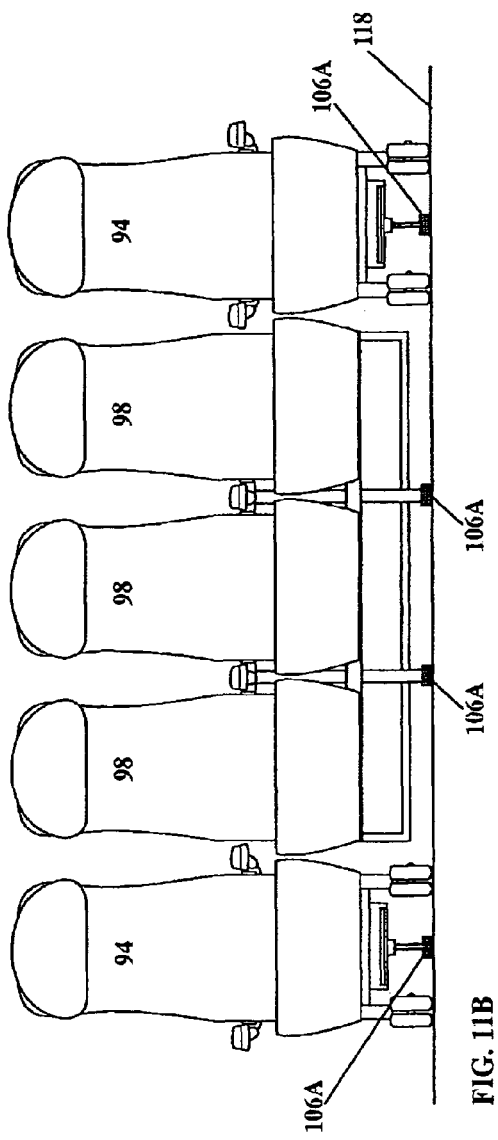

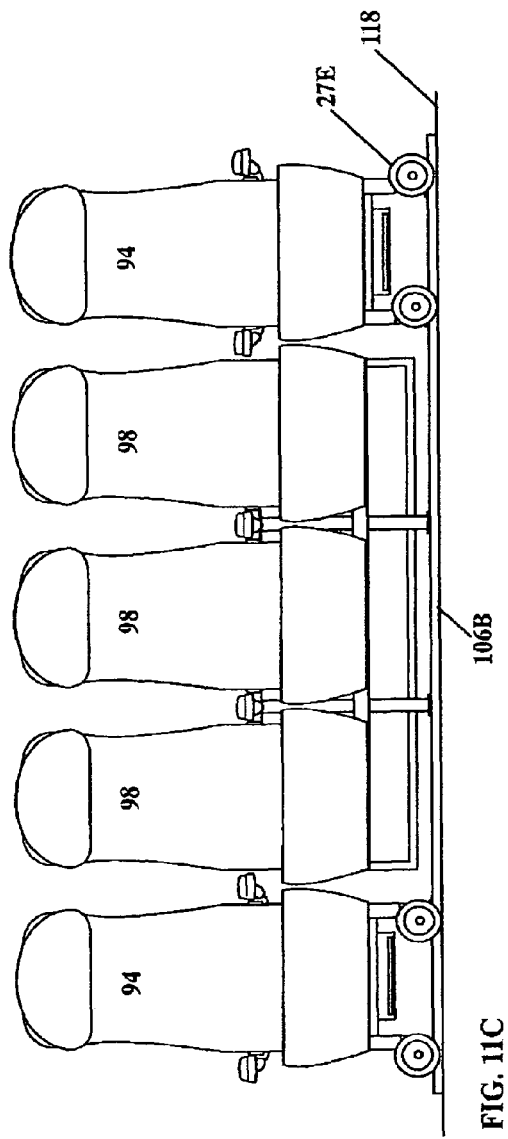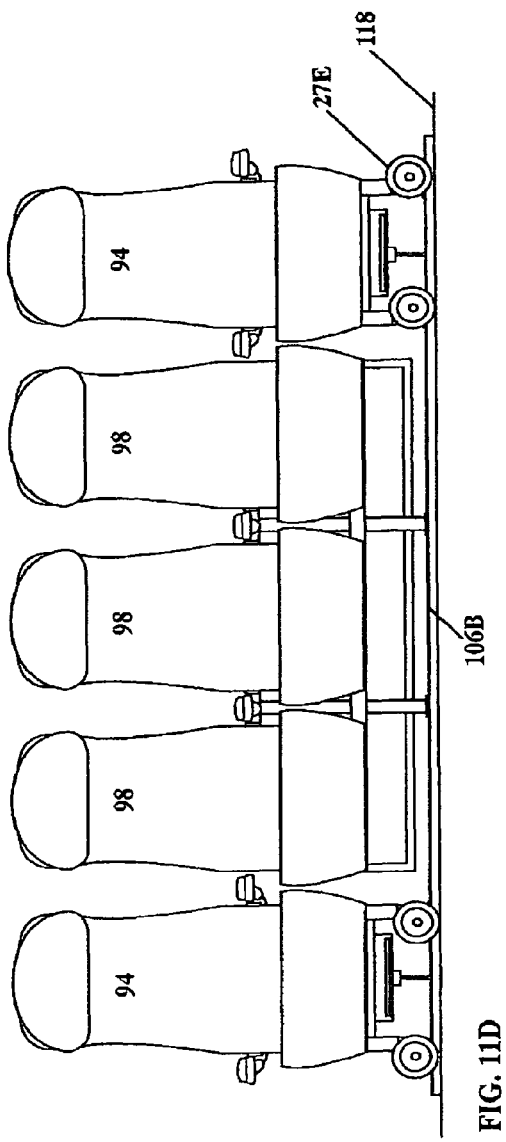

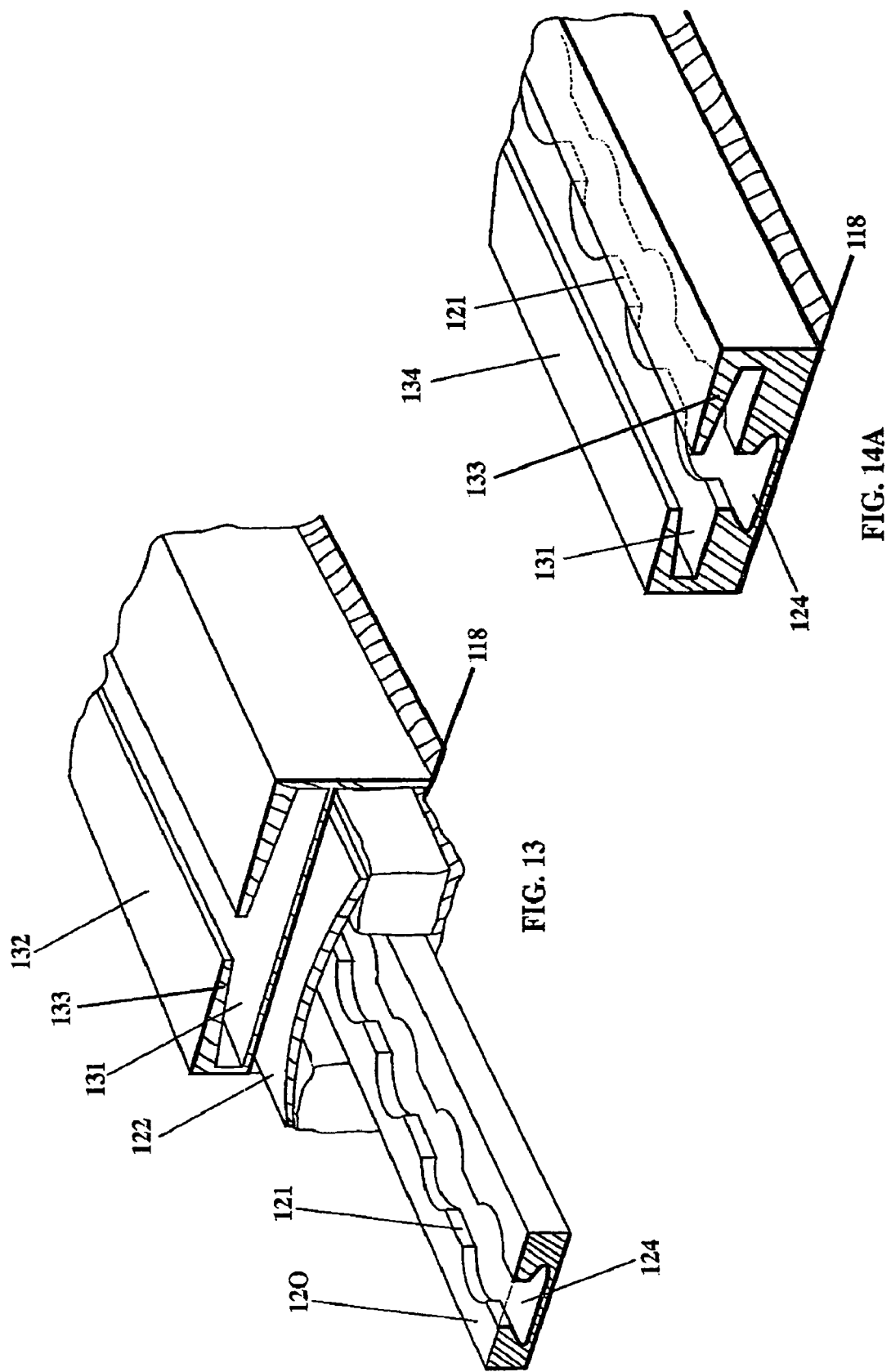

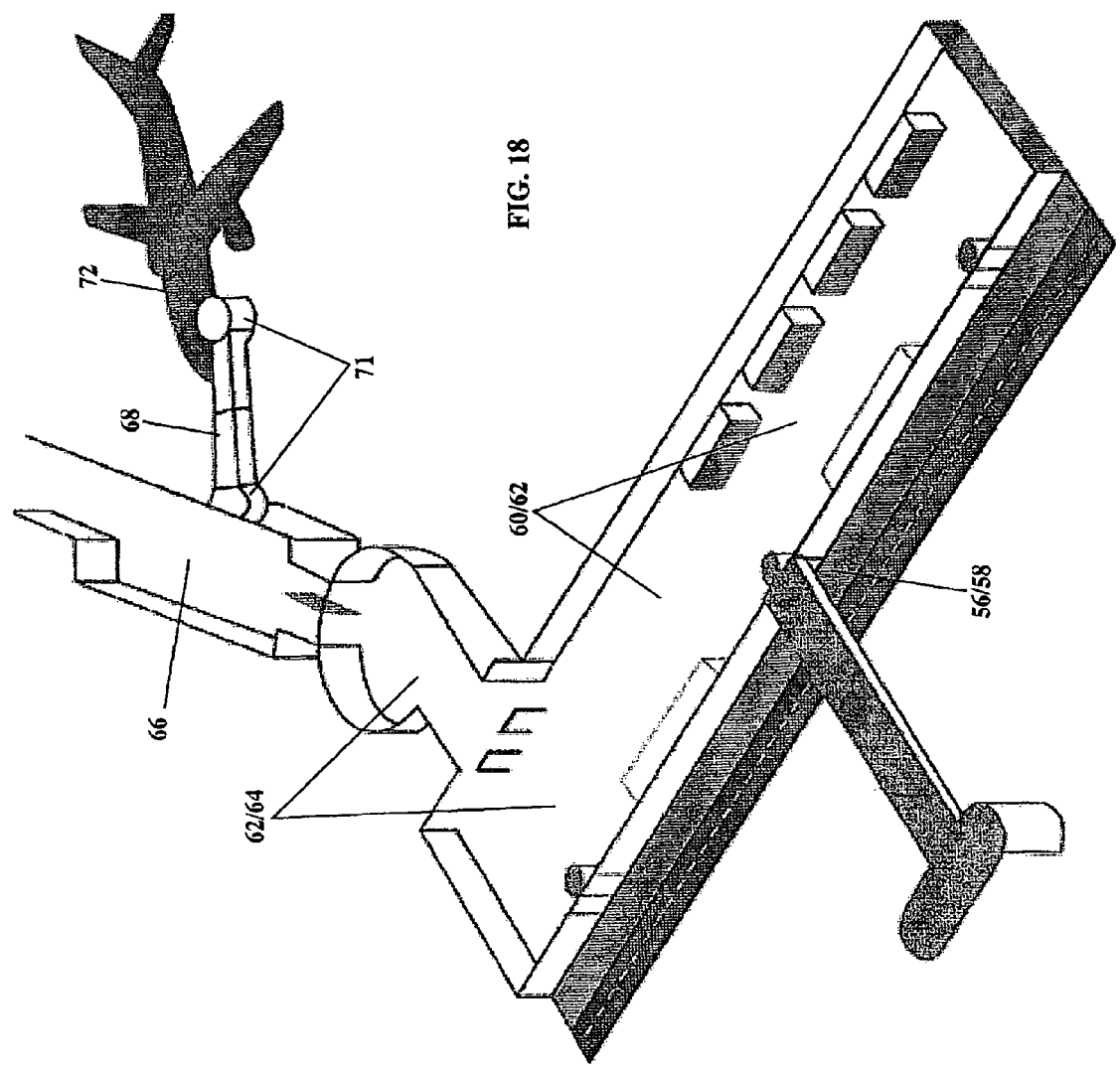

SYSTEM AND METHOD FOR INTEGRATING HANDICAPPED ACCESSIBLE SEATS INTO AIRCRAFT INTERIOR CONFIGURATIONS

CROSS-REFERENCE TO RELATED APPLICATIONS

This application is a National Phase Application of PCT International Application No. PCT/US2007/019758, International Filing Date Sep. 12, 2007, claiming priority of U.S. Provisional Patent Application No. 60/843,896, filed Sep. 12, 2006, and U.S. Provisional Patent Application No. 60/851,350, filed Oct. 11, 2006 which are hereby incorporated by reference.

TECHNICAL FIELD OF THE INVENTION

This invention generally relates to aeronautical vehicle systems, passenger aircraft seat structures, aircraft seating configurations, passenger aircraft seat fastening systems and aircraft boarding and deplaning methods. More specifically, this invention relates to improved systems, devices, and methods for transporting handicapped passengers into, out of, and within aircraft interiors

BACKGROUND OF THE INVENTION

More than any other major form of transportation, air travel restricts or discourages the mobility impaired. The accessibility barriers created by air travel have proven to be so severe that many of those who are physically disabled avoid flying entirely. With improved recognition of rights of disabled people, many public forms of transportation have been modified to provide equal access. However, modifications have not included any system or device that provides unhindered access into and within aircraft. Previously considered insignificant or unimportant by the airline industry, over 21 million Americans who suffer from mobility impairments deserve convenient and barrier-free travel.

Physical transfers present some of the most challenging issues experienced by mobility impaired users during air travel. Because a standard wheelchair is too wide to fit or maneuver down a typical aircraft aisle, it is necessary that some other devices be used for boarding and deplaning mobility impaired passengers-none of which have been dramatically improved upon or re-designed in decades. Depending upon the type of disability, a passenger is usually transferred from one seat or device to another a minimum of four times during any given trip. The transfer process currently involves four types of devices typically provided by an airline carrier: standard airport wheelchairs as shown in FIG. 1, boarding or aisle chairs (a narrow, wheelchair-like device used to transport the mobility-impaired passenger between the airport terminal gate, via sky bridge or aircraft steps, onto the aircraft and up to the aircraft seat) as shown in FIG. 2, a standard aircraft seat as shown in FIG. 3, and narrow, in-flight wheelchairs used for mobility within the aircraft (most often collapsible and stored within an aircraft closet) as shown in FIG. 4. The aisle chair or boarding chair, as shown in FIG. 2, particularly remains one of the most dreaded pieces of equipment within the travel process due to both aesthetics (restrictive and institutional), lack of comfort, and functionality.

FIG. 5 shows current locations within the airport and aircraft where physical transfers of mobility-impaired passengers often take place. Upon arrival to an airport 56, a passenger would typically be transferred from the vehicle that brought them to airport into a personal wheelchair or assistive device 58. From a personal device, the passenger is then transferred into a standard airport wheelchair (see FIG. 1) or power chair provided by the airport 62 upon entering the airport terminal 60, while checking a personal mobility device into baggage and cargo, or after going through security checkpoints 64. When the passenger reaches the boarding area 66, he/she is again transferred from a standard airport wheelchair, into a boarding chair or aisle chair (see FIG. 2) at the gate 70, which takes him/her down the sky bridge 68, and/or into the aircraft interior 72. Once the passenger reaches his/her assigned seat, he/she must be lifted from the boarding chair, into an aircraft seat (see FIG. 3) at 71. If a passenger needed to use the lavatory during a flight, they he/she would transfer from an airline seat, into an in-flight wheelchair (a special chair for use in the aisles of the aircraft; see FIG. 4) at 76. When reaching the lavatory, he/she would be lifted from the aisle chair, into the lavatory, or onto a lavatory seat 78. Assuming a passenger on a 16-hour flight would require use of the lavatory more than once, transfers 76 and 78 would be required numerous times, especially during long-haul flights and depending upon individual passenger situations. Upon arriving at the passenger's destination, the entire transfer process 74, 70 would reverse, after baggage handlers retrieve the passenger's personal mobility device from the cargo hold, and subsequently transfers 62 and 68.

If even one physical passenger transfer were eliminated within the travel process required for mobility-impaired persons traveling to a destination via an aircraft, the overall travel experience for a disabled passenger would improve greatly. According to standard airline procedures, when boarding or deplaning, a minimum of two specialized attendants are usually present to assist mobility-impaired passengers during transfers. Due to current liability issues within the physical transfer process, flight attendants are often not permitted to physically assist mobility-impaired passengers in moving into or within the aircraft. Although airlines do provide specially trained service agents or passenger attendants for on-ground physical assistance, flight attendants are usually not permitted to assist in the transfer of a passenger while in-flight, even when passengers request use of the lavatory (with the exception of retrieving the in-flight wheelchair). Physical transfers within the aircraft not only places a barrier between flight attendants and mobility impaired passengers, but it creates another huge responsibility and financial cost (hiring a personal aid and additional ticket costs) that mobility impaired users need to consider, more than any other able-bodied passenger.

Injuries during the physical transfer process have been cited as common occurrences, especially during transfers between a boarding chair and aircraft seat. These injuries concern both passengers and airline staff or passenger attendants (any individual who participates in the task of transferring a passenger, such as an airline employee, a service contractor, or a passengers personal assistant). Within other forms of transportation such as cars, trains, and buses, one approach to lessening the danger experienced during physical passenger transfers has been the modification of vehicles floors and/or vehicle seat frames to receive wheelchairs and/or means for locking the wheelchairs into a generally immobile position. However, wheelchairs themselves are bulky and substantially reduce the number of passengers that can be carried in one vehicle, especially within an aircraft. Other modifications made to wheelchairs may be dangerous in that they ultimately reduce the crashworthiness of the seat itself. Another approach has been the provision of a safety seat much like those used in automobiles to seat small children.

However, these seats are primarily useful for infants and very small children and have not been well designed for use by adults or large children.

In 2000, Theradyne (a division of Kurt Manufacturing) and Delta Airlines introduced the first new aircraft accessibility product, in decades. Containing a hydraulic mechanism, which adjusts its height to the height of stationary armrests, the Delta Chair was thought to have revolutionized the standard aisle chair by eliminating strenuous transfers over fixed armrests, making it easier for passengers to slide directly onto the aircraft seat. Although the Delta Chair is helpful in certain circumstances, six years later, only Delta has provided access to the chair, and some of its own employees are still unaware that it exists. The Delta Chair is also aesthetically displeasing (maintaining the same visual qualities of the boarding chair), while preventing to eliminate or even substantially improve or eliminate any physical transfers.

Another problematic area within aircraft interiors for passengers with mobility impairments is in-flight lavatories. Currently, Airlines are required to allocate accessible lavatories only on planes containing more than one aisle. Travel guides provided to mobility impaired users have often recommended wearing diapers, since the transfer process into the lavatory is both problematic and discomforting. Even though some lavatories are considered by airlines accessible, many passengers are still restricted from access. Usually, the in-flight wheelchair is not able to completely fit into the lavatory, along with any other person required for assistance during the transfer. Considering these criteria, a majority of those with mobility impairments sit in coach, and have often been assigned seating in the middle of the plane (away from any lavatory, accessible or not). Not only does a trip to the bathroom require additional assistance from on-board staff as well as an additional transfer, it involves disruption to other passengers, who might need to move from their seats or to assist with the transfer. Accordingly, there is a need for improved access to in-flight lavatories by mobility-impaired persons.

Commercial aircraft passenger seating installation and attachment therein has remained mechanically uniform throughout the aircraft industry. Optimal use of available space coupled with secure and safe connections while maintaining ease of assembly and disassembly are the goals sought in the design of aircraft seat anchors. Aircraft passenger seats are typically constructed from modular components, the size, weight and construction of which are dictated by many considerations, including fuselage dimensions, aesthetic and safety considerations. Many of these requirements are imposed by law or regulation. The lower seat frame is usually constructed of a plurality of leg modules, while the upper seat is constructed of section assembly modules. The leg modules are attached to fixed, spaced-apart attachment points on a supporting surface, such as the deck of an air craft fuselage as shown by seats 98 in FIG. 11A.

Most passenger aircraft use a similar installation system, which includes rigidly attaching a passenger seat assembly or individual aircraft seats to an aircraft fuselage to prevent movement of the seat assembly or aircraft seat during flight and in an event of a collision. During installation, the passenger seat assembly is rigidly attached to an aircraft fuselage via a seat track 120 as shown in FIG. 12A, which extends in fore and aft directions along the length of a passenger, compartment as shown in FIG. 8A. Counterbores 124 exist at periodic increments along the seat track 120 for installation of multiple passenger seat assemblies.

As shown in FIGS. 12A and 12B, a seat assembly usually includes a base 126 containing multiple shear plugs 130A. The seat assembly is typically pushed in a downward and forward direction relative to the seat track 120 to insert the shear plugs 130A on the seat assembly into the counterbores 124 in the seat track member 120. As the seat assembly is forced in a forward direction a forward portion of the base is inserted between a seat track upper lip 121 and counterbores 124. The combination of the shear plugs 130A locking within the counterbores 124 and the presence of the upper seat track lips 121 prevents movement of the seat assembly and provides structural restraint of the seats in the airplane.

There are many variations of systems and methods for securing and attaching fixed aircraft seats to track members. One variation involves hand tools, in which seats are secured to the track member by tightening bolts or the like, or by activating internal channels within the track which clamp or lock the track member to the shear plugs of an aircraft seat or seating assembly. Many variations involve the provision of a control lever, which secures the shear plugs of an aircraft seat or seating assembly U.S. Pat. No. 5,975,822 discloses a quick release fitting comprising an outer housing that is keyed to the floor track channel. The outer housing has a bore that houses a rotatable inverted T-shaped key that rotates through a 90-degree angle to engage the underside of the floor channel interior. The T-shaped key has a lever and spring-loaded pin lock that allows the user to manly rotate the key and lock it in position. Other track fittings are disclosed in U.S. Pat. Nos. 3,189,313; 3,620,171; 3,652,050; 3,677,195; 3,810,534; 4,026,218; 4,062,298; 4,109,891; 4,114,94.7; 4,396,175; 4,493,470; 4,509,888; 4,688,843; 4,708,549; 4,718,719; and 4,911,381, the disclosures of each of which is incorporated herein by reference.

Due to demands for more diverse seating configurations and quick installation techniques, new technologies and recent advancements, such as those employed by Textron Inc. in the seat fastening system "Intevia", include intelligent fastening solutions enabling remote locking and unlocking of fasteners without any physical contact with the fastener. The system features specially designed coupling or fastening mechanism driven by a smart material actuator, which is controlled by an embedded microchip, wherein fastening mechanisms are activated by an instruction rather than an applied physical force through a manipulating tool. Through the embedded microchip, each fastening mechanism has a unique address and can be instructed to lock or release, (i.e., perform the mechanical connection function). In addition, the embedded microchip is capable of reporting mechanism status, controlling the actuation process, as well as sensing and reporting local environmental conditions. Although methods for securing aircraft seats to the fuselage of an aircraft have become and will become more and more complex as the Intevia system, most methods and systems will usually contain a track member and series of counterbores or openings, along with an internal channel.

Due to limited cabin and aisle space within aircraft, and airlines which employ maximum seating capacities or configurations, the implementation of a method or system equivalent to the present invention has been previously unworkable for decades. However, advanced fuel efficient long-haul aircraft currently being designed and manufactured by companies such as Boeing (787 Dreamliner) and Airbus (A380) for commercial use during the year 2007 and thereafter will contain a much higher seating capacity and or overall interior space and fuselage size than current aircraft. This creates alternatives or allows sensitivity to introducing wider aisles and addressing current accessibility issues resulting from current aircraft size and tight cabin configurations, all of which have prevented the previous employment of improved techniques and methods for transferring disabled persons during air travel.

SUMMARY OF THE INVENTION

The above-mentioned needs are met by the present invention, which provides a system and method for integrating handicapped accessible seats into aircraft interior configurations. A handicapped accessible seat, a means of attachment or docking between an aircraft floor and a handicapped accessible seat, and method for transporting mobility impaired passengers into, out of, and within aircraft interiors is provided.

Accordingly, the present invention allows the first designated handicapped accessible seating area(s) within a commercial aircraft interior while minimizing embarrassing and uncomfortable physical transfers for passengers with mobility impairments. It is intended that this invention improves and/or eliminates physical passengers experienced by mobility impaired passengers from the airport and into, out of, and within commercial aircraft interiors, thus improving safe transportation of handicapped persons.

The present invention has several advantages over existing aircraft seating systems and configurations. One advantage of the present invention is that it may allow for seating installations to be performed or seating system configurations to be altered without causing pre-existing seat hacking systems to be changed. A further object of the invention is to provide a handicapped accessible feature for an aircraft interior, which can easily be incorporated into or work in conjunction with standard or current aircraft seat configurations and fastening systems.

Another advantage of the present invention includes universal features within the system, which consider all potential users, rather than only users with mobility impairments or able-bodied passengers. An able-bodied passenger is able to sit in any seat within an aircraft seating configuration with almost no indifference to any aircraft seat being designated as accessible or within a special area. The accessible seat can also provide additional comfort for taller or pregnant passengers due to the unique placement and configuration, additional legroom, and/or proximity to a lavatory. By blending into the aesthetics of a surrounding cabin and aircraft seat design aesthetic, accessible seats as defined by the invention will not look humiliating or different than other seats (with the exception of the wheels or casters underneath, which can be easily concealed by an elevated track or other casement methods while in a stationary position.) It is the intention that air-lines will be able to implement the invention within diverse aircraft seating designs, fastening systems and aesthetics.

The present system or method eliminates in many situations a minimum of two physical transfers for any passenger with mobility impairment, previously requiring the assistance of devices such as a standard wheelchair, boarding chair or aisle chair, and in-flight wheelchair during the travel process. At a minimum, the invention should also eliminate the use of the boarding chair or aisle chair as shown in FIG. 2. Through the use of the present invention, potential for injury is minimized, therefore increasing the overall comfort during air travel for all passengers and airline staff.

BRIEF DESCRIPTION OF THE DRAWINGS

Further features and advantages of the invention will become apparent from the following discussion and accompanying drawings, in which:

FIG. 5 shows current locations and transfer points within the airport and aircraft where physical passenger transfers usually take place;

FIG. 8A shows a top view of a handicapped accessible aircraft seat, positioning itself within an aircraft configuration, and located behind seats fixed to track members mounted in a fore and aft direction;

FIG. 8B shows a top view of a handicapped accessible aircraft seat, positioning itself within an aircraft configuration, and located adjacent to seats fixed to track members mounted in a side to side direction;

FIG. 11A shows a front view of two handicapped accessible aircraft seats located within a row of stationary aircraft seats mounted on fixed tracks located in a fore to aft position;

FIG. 11B shows a front view of two handicapped accessible seats located within a row of stationary aircraft seats mounted on fixed tracks located in a fore to aft position;

FIG. 11C shows a front view of two handicapped accessible seats located within a row of stationary aircraft seats mounted on fixed tracks located in a side-to-side position;

FIG. 11D shows a front view of two handicapped accessible aircraft seats located within a row of stationary aircraft seats mounted on fixed tracks located in a side-to-side position;

FIG. 13 is a 3-dimensional view of a typical aircraft seat track assembly with a separate bracket or fitting secured above containing a groove;

FIG. 14A is a 3-dimensional view of a seat track assembly containing round counter bores existing in periodic increments along the seat track, while containing a groove above;

FIG. 18 shows locations within the airport and aircraft where physical passenger transfers will take place with implementation of the present system and method.

DETAILED DESCRIPTION OF THE PREFERRED EMBODIMENTS

The present system and method for integrating handicapped accessible seats into aircraft interior configurations is preferably comprised of several components.

Figure 2:
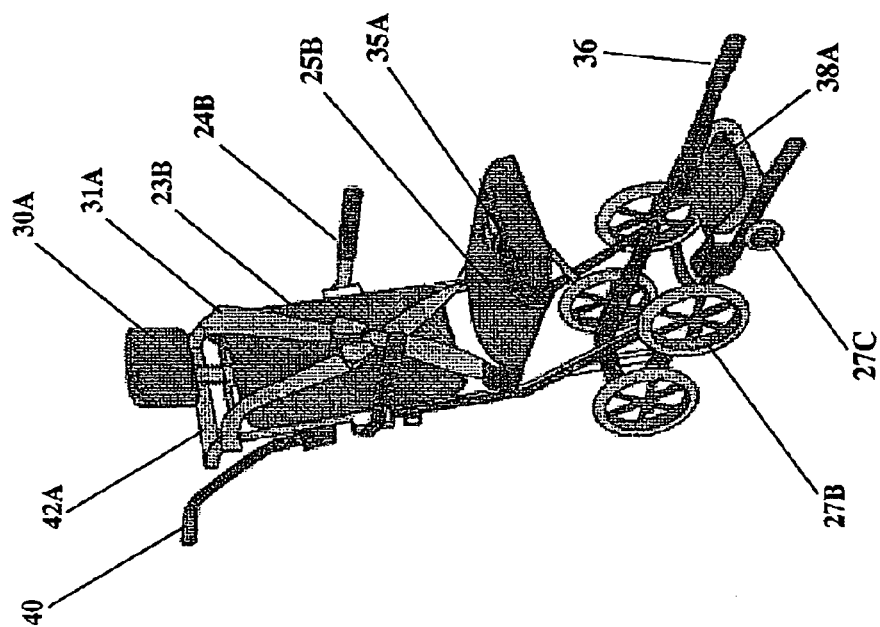
FIG. 2 is a 3-dimensional view of a typical boarding chair or aisle chair.
Figure 1:
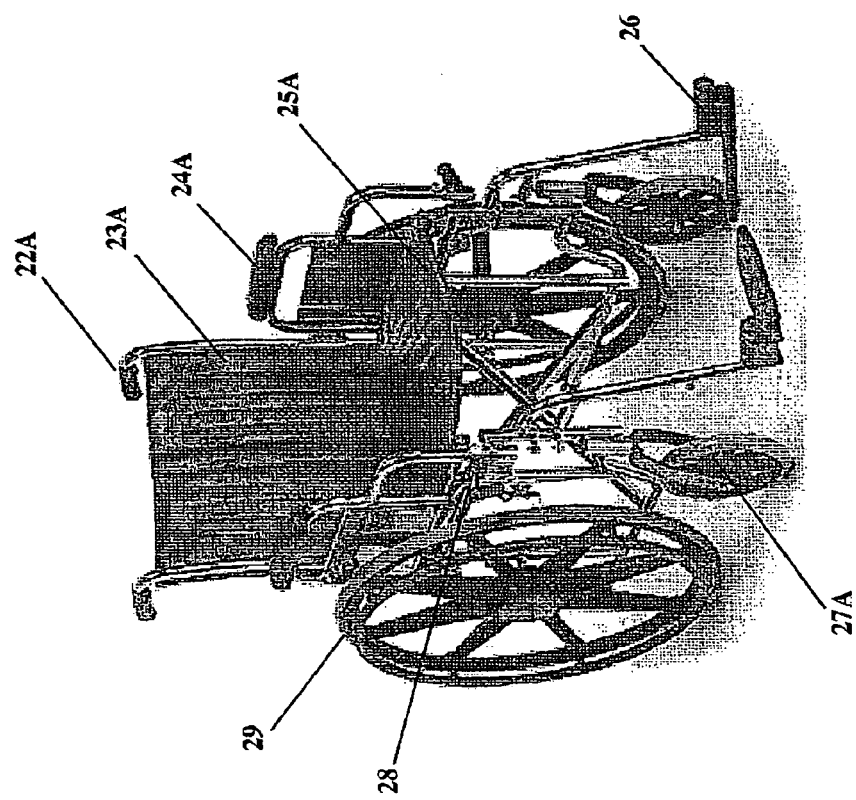
FIG. 1 is a 3-dimensional view of a standard airport wheelchair.
Figure 3:
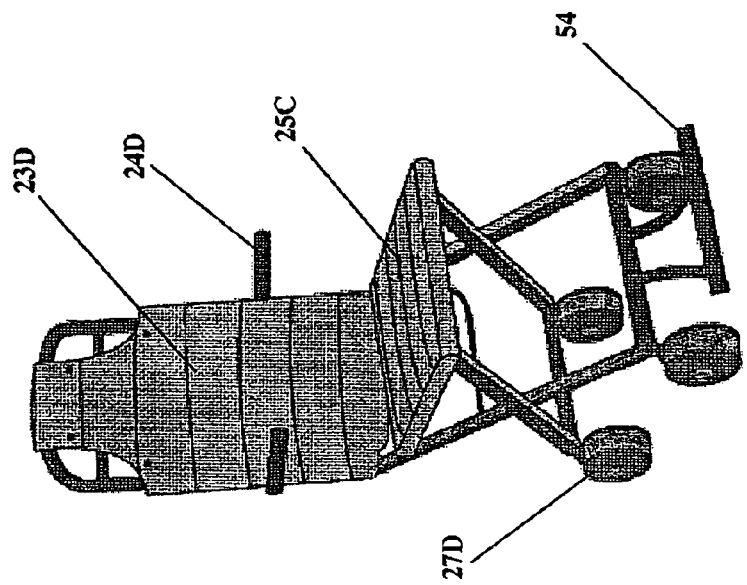
FIG. 3 is a 3-dimensional view of a standard aircraft seat.
Figure 4:
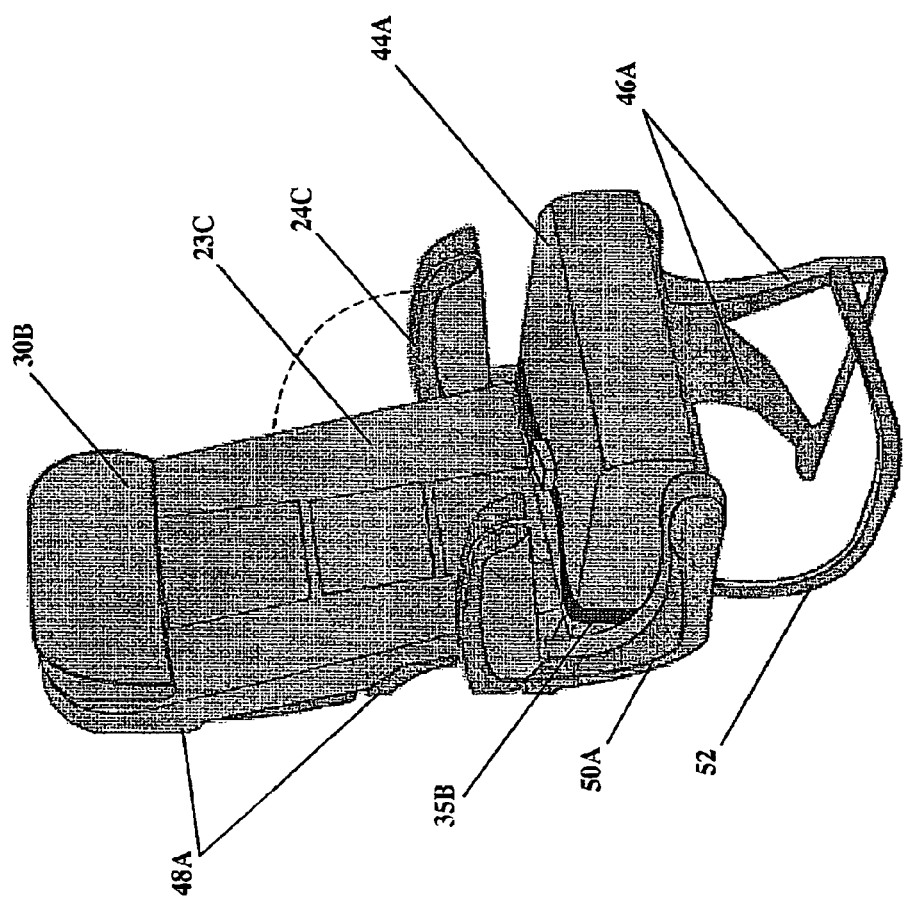
FIG. 4 is a 3-dimensional view of a typical in-flight wheelchair.
Figure 10:
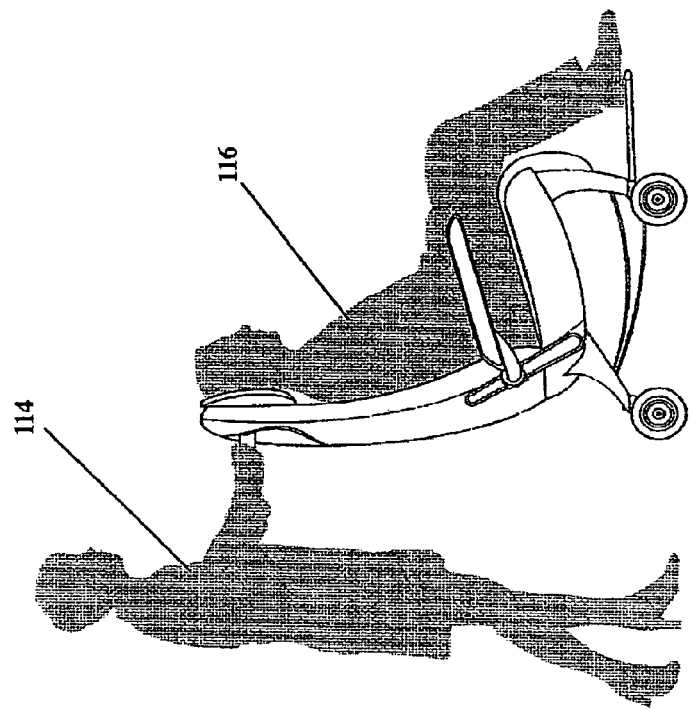
FIG. 10 shows a side view of a handicapped accessible aircraft seat while being maneuvered by a passenger attendant or flight attendant and transporting a passenger.

As shown in FIGS. 6A-E, the system includes a configuration of aircraft seats containing at least one handicapped accessible seat 94 as defined by a seat containing wheels or caster devices 27E wherein the seat can be maneuvered or become mobile within an aircraft by a passenger and/or passenger attendant 114 as shown in FIG. 10. The handicapped accessible seat provided implements the characteristics of a standard airport wheelchair as shown in FIG. 1, a boarding chair or aisle chair as shown in FIG. 2, and an in-flight wheelchair as shown in FIG. 4 into a typical aircraft seats as shown in FIG. 3. Typical or existing casters or wheels 27E, similar to wheels or casters 27A, 27B, 27C, 27D (see FIGS. 1, 2 and 4) mounted to the bottom of structure 46B and containing a common existing support member rotatably supporting the wheel or caster 82, allow the handicapped accessible seat to easily maneuver and to turn within the confines of a designated aircraft interior environment as shown in FIGS. 7A and 7B.

Figure 9A:
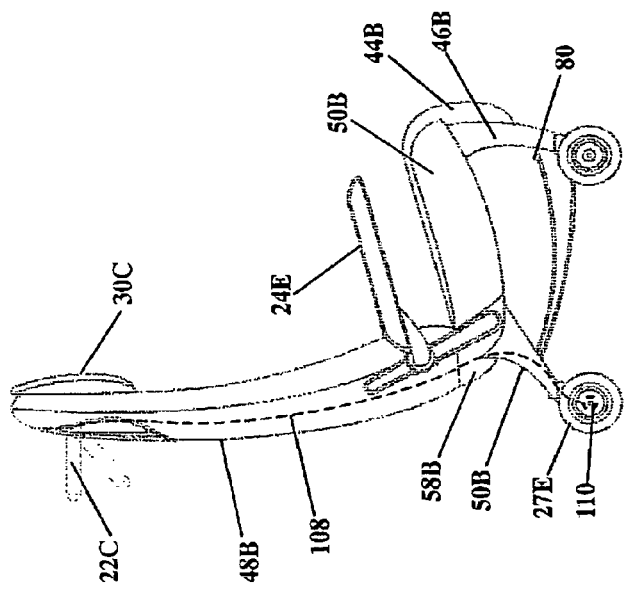
FIG. 9A shows a side view of a handicapped accessible aircraft seat, indicating a pneumatic, electrical, smart, or cable brake method.
Figure 9B:
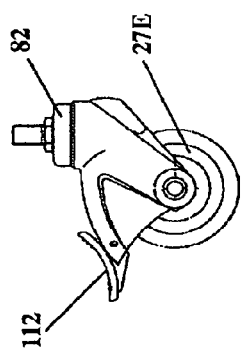
FIG. 9B shows a side view of a handicapped accessible aircraft seat with a typical wheel or caster containing a foot-activated brake lever.

Wheels or casters 27E of the accessible seat should brake or lock into place in a manner whereas the seat will be held motionless when placed at an angle and faced uphill or downhill and according to current in-flight FAA regulations. Braking levers 112 or locking activators may be located on the caster itself and activated by the foot as shown in FIG. 9B. Braking or locking activators may also be located within other parts of the handicapped accessible aircraft seat as shown in FIG. 9A, or implementing other advanced intelligent activator solutions, smart materials, electrical or pneumatic triggers. One such scenario, as shown in FIG. 9A, would be a pail of push handles and/or brake levers 22C coupled with a brake cable 108 and braking mechanism 110 within or on wheels or casters 27E located within the seat back casement 48B which controls the chain's braking system; when the handles or levers 22C are flush with the seatback casement 48B, the brake is engaged. The flight or passenger attendant can unlock the chair from the seated position by standing behind it, pulling the handles 22C up.

Figure 6B:
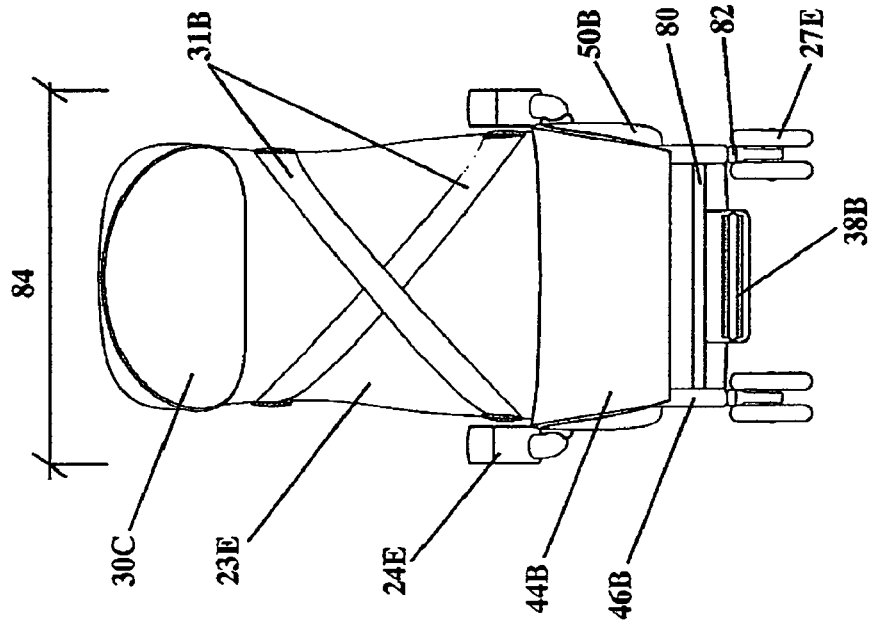
FIG. 6B is a front view of a handicapped accessible seat.
Figure 6A:
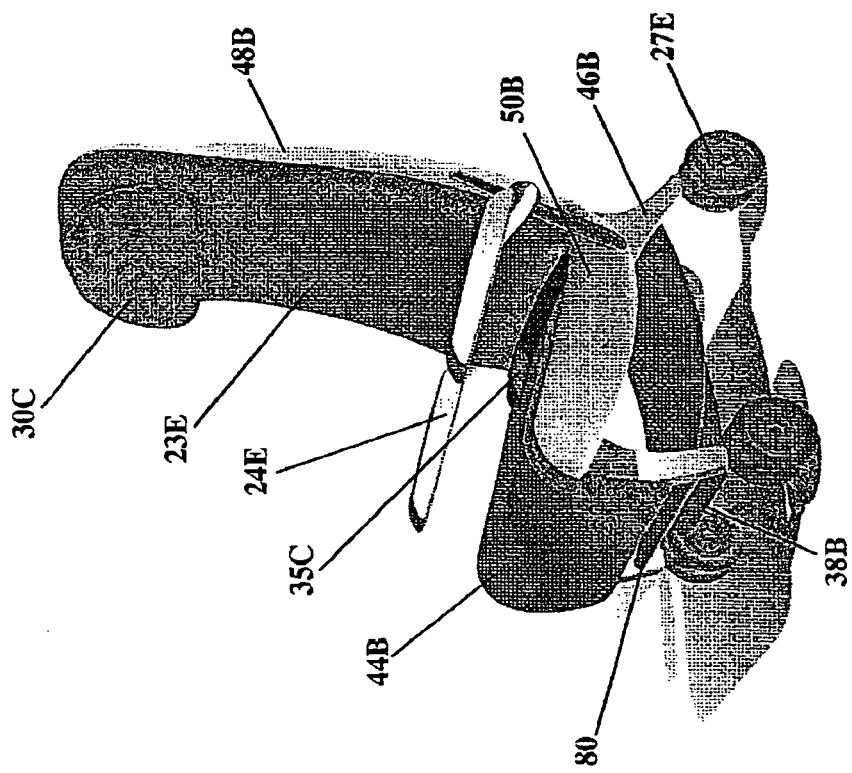
FIG. 6A is a 3-dimensional view of a handicapped accessible seat.
Figures 6C, 6D, 6E:
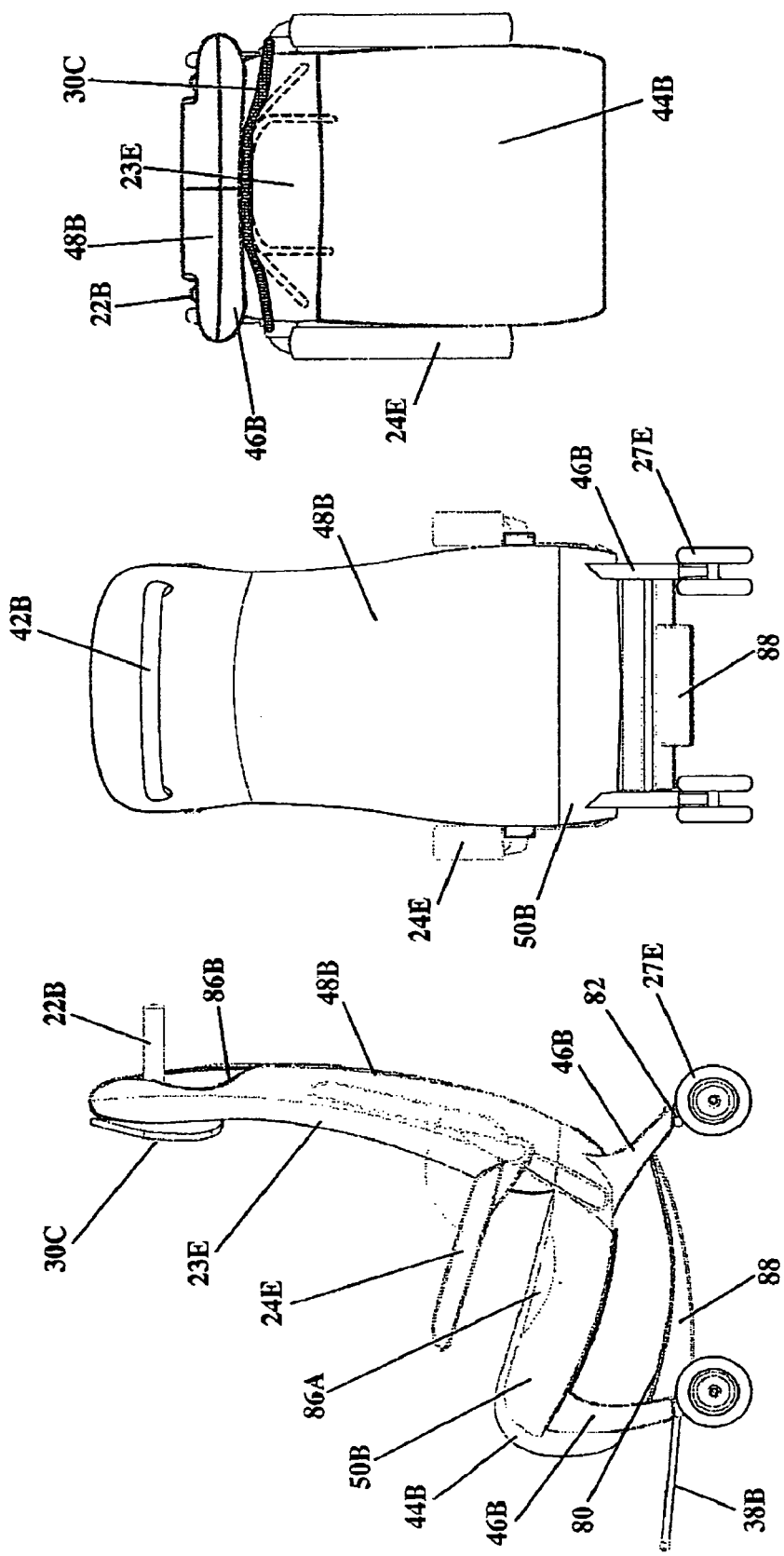
FIG. 6C is a side view of a handicapped accessible seat.
FIG. 6D is a back view of a handicapped accessible seat.
FIG. 6E is a top view of a handicapped accessible seat.

The handicapped accessible seat classifies functionally as an aircraft seat, as shown in FIGS. 6A, 6B, 6C 6D and 6E, by encompassing: seat back upholstery 23E, headrest 30C, seatback casement 48B, moveable armrests 24E, seat bottom and flotation cushion 44B, seatbelt 35C, seat bottom casement 50B, and seat bottom structure 46B, wherein most structural parts resemble similar parts of surrounding aircraft seats within a configuration. Additional parts may distinguish the handicapped accessible seat from a standard or stationary aircraft seat, and to allow the present invention to successfully function as a system. These parts include: a footrest 38A/38B, and push handles 22B, 22C or push handlebar 42B. Extra parts or options such as additional recessed handles or grip surfaces 86A, 86B located on or within the bottom seat casement 50B and/or within the seat back casement 48B, would further improve safety and ease of use of the handicapped accessible seat while maneuvering into a stationary position as shown in FIG. 5B. Shoulder or upper extremity restraint belts 31B may be provided within the seatback casement 48B, or can be applied and removed in order to prevent passengers with severe mobility impairments from falling out of the seat during mobility or maneuvering. An example of implementation of a shoulder belt is shown in FIG. 6B.

Figure 7A:
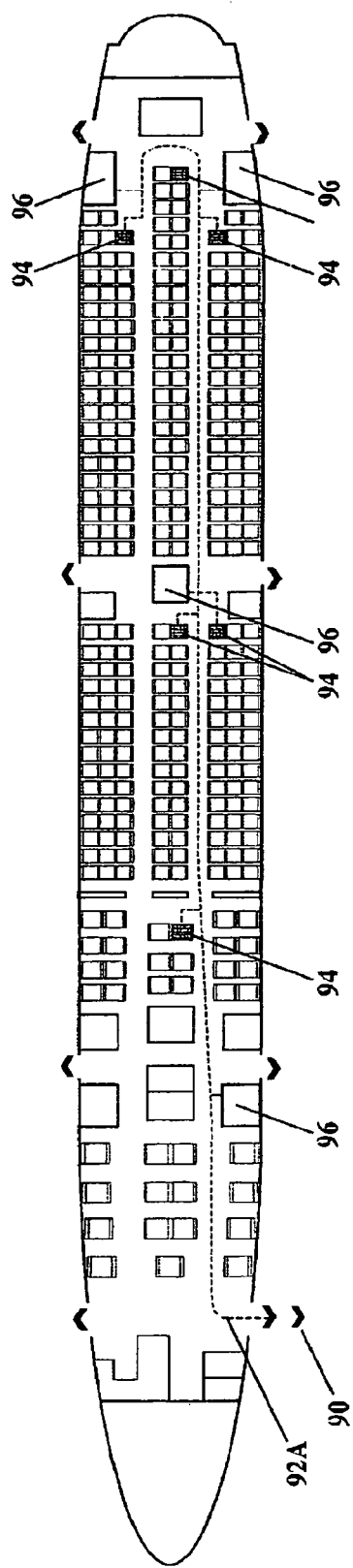
FIG. 7A is a plan view, which shows an example of a wide body aircraft interior configuration, recommended/possible areas for implementation of handicapped accessible seats (shaded dark) fixed to a track member located in a fore and aft position, and projected paths of travel of the handicapped accessible seat within the aircraft interior.
Figure 7B:
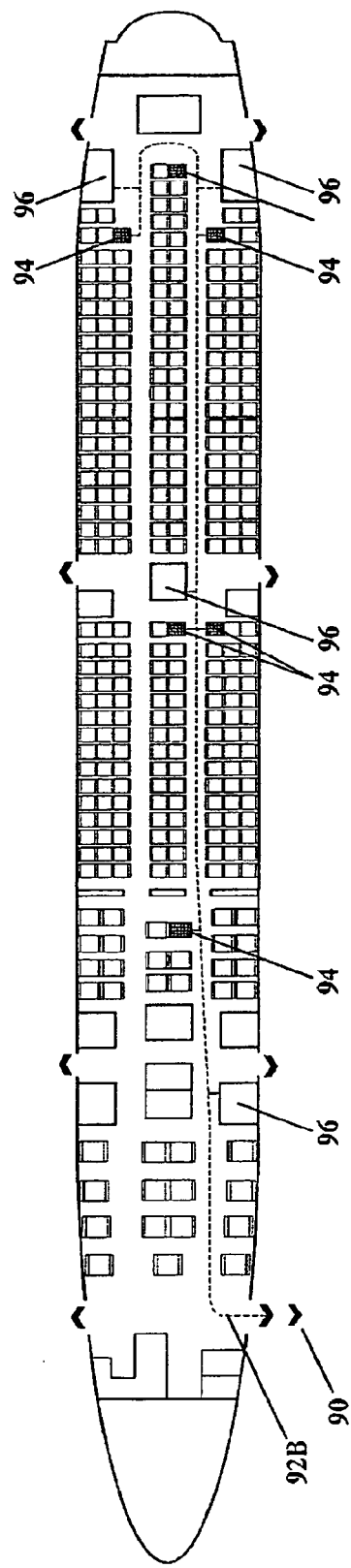
FIG. 7B is a plan view, which shows an example of a wide body aircraft interior configuration, recommended/possible areas fox implementation of handicapped accessible seats (shaded dark) fixed to a track member located in side-to-side position, and projected paths of travel of the handicapped accessible seat within the aircraft interior.

FIGS. 7A and 7B show an example of a wide body aircraft interior configuration, recommended/possible areas for implementation of handicapped accessible seats (shaded dark) fixed to a track member located in a fore and aft position (FIG. 7A) and a in side-to-side position (FIG. 7B), and projected paths of travel of the handicapped accessible seat within the aircraft interior FIGS. 8A and 8B show a handicapped accessible aircraft seat being positioned within an aircraft configuration, and located behind seats fixed to track members mounted in a fore and aft direction (FIG. 7A) and a in side-to-side position (FIG. 7B).

Aircraft interior environments as is shown in FIGS. 7A, 7B, 8A and 8B allow for implementation of an accessible aircraft seat as described by the general scope of the invention wherein a minimum of one aisle within the aircraft must maintain a width 100 that is greater than the overall width of a handicapped accessible aircraft seat 94, allowing for complete maneuverability of the handicapped accessible seat within the aircraft. To assist in accurate maneuvering or positioning of a handicapped accessible seat, a typical channeling, track or grove-type guide 104 as shown in FIGS. 8A and 8B or similar existing methods may be used or placed within the cabin floor throughout to direct caster wheels or other mobile or maneuvering parts into a specified direction (such as a stationary position within a seat row, or within in-flight lavatories).

The present invention also provides a means of attachment or docking between an aircraft floor and a handicapped accessible aircraft seat. The means of attachment used within the present invention may be accomplished by any number of ways, such as the following preferred tracking systems or method variations.

Figure 12C:
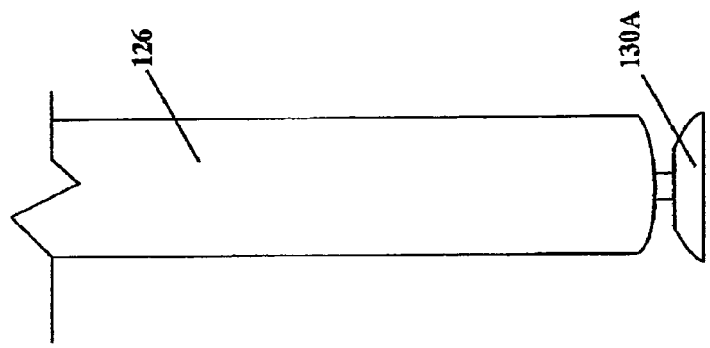
FIG. 12C is a front view of a typical aircraft seat leg and shear plug.
Figure 12A:
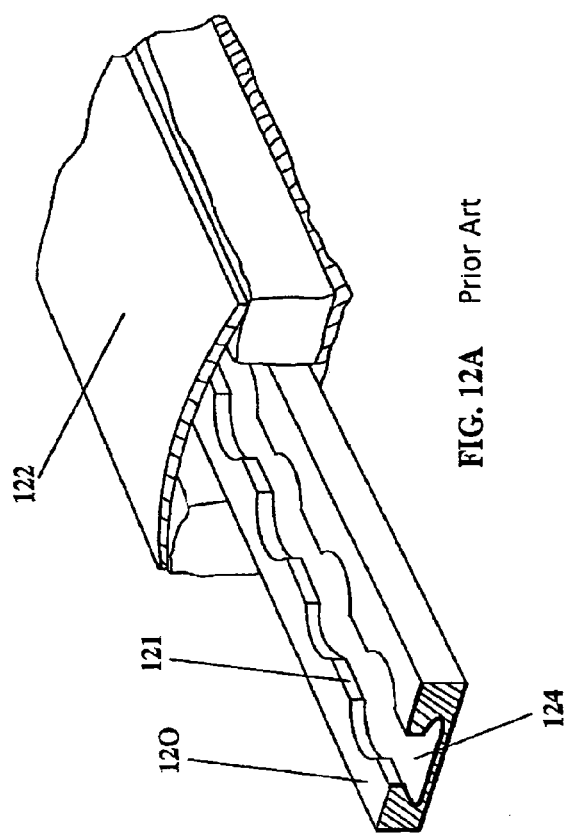
FIG. 12A is a 3-dimensional view of a typical aircraft seat track assembly.
Figure 12B:
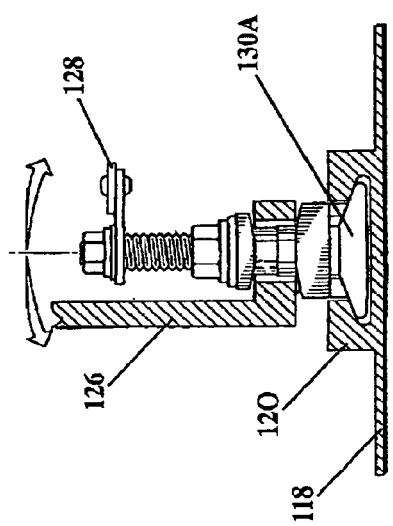
FIG. 12B is a front section view of a typical aircraft seat track assembly with a quick-release mechanism.

In a typical attachment of an aircraft seat to an aircraft, a typical track member 120 or elongated base located in a fore to aft position or side to side position within an aircraft, as shown in FIG. 12A, has a flange like extension 121 running longitudinally thereof, comprising counterbores 124 shaped generally complementary to a leg 126 of a fixed aircraft seat for positioning in mating association with said leg 126 of a fixed aircraft seat and shear plug 130A. Aircraft seat 98 has a stationary aircraft seat bottom structure 46A/46B and shear plug 130A generally located at the bottom of a seat leg 126 and in mating association with a typical track member 120 and counterbore 124, as shown in FIGS. 12B and 12C. Such mating associations with tracks are well known in the art.

Figure 16:
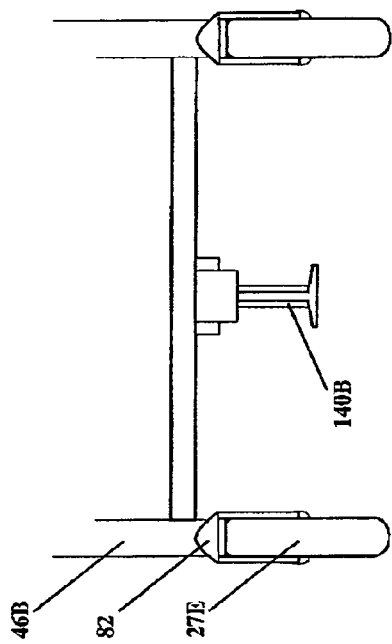
FIG. 16 shows a front view of a handicapped accessible aircraft seat structure containing a male plug or member for securement within tracks mounted in a fore and aft position or a side to side position.
Figure 15:
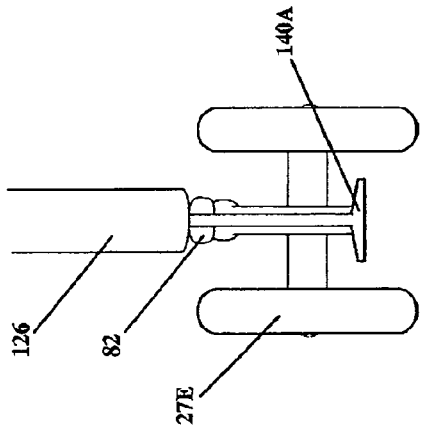
FIG. 15 shows a front view of a typical wheel or caster containing a male plug or member.

In a first embodiment of the invention, track member 120 preferably also has a bracket or track member 132 secured on top of a typical track member 120 or adjacent to a typical track fitting, as shown in FIG. 13, and containing inwardly-extending longitudinal flanges 133 creating gaps 131 shaped complementary to a corresponding mating association plug 140A/B located on the wheel or caster 27E or bottom seat structure 46B of a handicapped accessible seat 94, as shown in FIGS. 15 and 16. Mating association plugs 140A/B corresponding flanges 133 and gaps 131 may be implemented within an aircraft seat 94 and 98 instead of, or in addition to, a shear plug 130A.

In this embodiment, the handicapped accessible aircraft seat 94 has wheels or casters 27E with a male or female mating association plug 140A located within wheels or casters 27E, as shown in FIG. 15, or mating association plug 140B located within the seat bottom structure 46B, as shown in FIG. 16, and corresponding to a bracket or track member 132. The accessible aircraft seat 94 may also feature a plunger assembly 142 and shear plug 130B and corresponding to a counterbore 124 of track member 120 within a mating association 14A/B to enforce securement, or a plunger assembly 142 and shear plug 130B within other parts of the bottom seat structure 46B containing mating associations 140A/B corresponding to a counterbore 124 within a track member 120

In order to mate with this track member 120, a typical track-engaging, locking, and/or braking means comprises a bolt, clamping member, control lever 128 as shown in FIG. 12B, and/or along with other advanced intelligent solutions, smart materials, electrical or advanced pneumatic trigger devices, connected to the upper body portion of track member 120 or within an aircraft seat bottom structure 46B, wheels or casters 27E or aircraft interior for releasably and fixedly securing and connecting the mating association 140A/B and/or sheer plug 130A/130B between a track member 120 and the leg 126/bottom seat structure 46A/46B or wheels or casters 27E of an aircraft seat. Such means are well known in the art.

FIG. 11A shows a front view of mating association plug 140A mounted within wheels or casters 27E of an accessible seat 94, corresponding to a bracket or track member 132 positioned in a fore to aft direction of the aircraft. FIG. 11B shows a front view of mating association plug 140B within the seat bottom structure 46B of an accessible seat 94, and corresponding to a bracket or track member 132 mounted in a fore to aft direction of the aircraft. FIG. 11C shows a front view of mating association plug 140A mounted within wheels or casters 27E of an accessible seat 94, corresponding to a bracket or track member 132 mounted in a side to side direction of the aircraft. FIG. 11D shows a front view of mating association plug 140B mounted within the seat bottom structure 46B of an accessible seat 94, and corresponding to a bracket or track member 132 mounted in a side to side direction of the aircraft.

A second embodiment of the invention is similar to the first embodiment in the use of mating association plug 140A located within wheels or casters 27E, as shown in FIG. 15, or mating association plug 140B located within the seat bottom structure 46B, as shown in FIG. 16. However, in the second embodiment, track member 134, as shown in FIG. 14A, is substituted for track members 122 and 132 as a whole part, featuring counterbores 124, while also containing inwardly projecting longitudinal flanges 133 creating gaps 131 shaped complementary to a corresponding mating association plug 140A/B located on the wheel or caster 27E or bottom seat structure 46B of a handicapped accessible seat 94, as shown in FIGS. 15 and 16.

In these embodiments, in order to mate with this track member 120, a typical track-engaging or locking means comprising a bolt, clamping member, control lever 128, as shown in FIG. 12B, and/or along with other advanced intelligent solutions, smart materials, electrical or advanced pneumatic trigger devices, connected to said upper body portion of track member 120 or within an aircraft seat, wheels or casters 27E or aircraft interior for releasably and fixedly securing and connecting the mating association of sheer plug 140A/140B between a track member 120 and the leg 126/bottom seat structure 46A/46B or wheels or casters 27E of an aircraft seat.

In these embodiments, the mating association 140A/B and/or sheer plug 130A/130B between a track member 120 and the leg 126/bottom seat structure 46A/46B or wheels or casters 27E of an aircraft seat is configured to mate with the gap 131 defined by flanges 133. Through means well known in the art, pressure is applied to mating association 140A/B and/or sheer plug 130A/130B to allow secure attachment within gap 131 and thereby to the track member. For example, mating associations 140A/B and/or sheer plugs 130A/130B could have an enlarged head, as shown in FIGS. 15 and 16, that would not permit insertion within counterbores 124. Such an enlarged head would be sized to slide within gap 131 from, one end of track 132 or 134 to another and permit secure attachment to tracks 132,139 below flanges 133. This attachment of mating association 140A/B and/or sheer plug 130A/130B to gap 131 within track 132 or 134 would most preferably not interfere with the attachment of similar mating associations 140A/B and/or sheer plugs 130A/130B in regular aircraft seats 98 within bores 124 of the same tracks at the same time.

In a third embodiment, typical track member 120 or elongated base, located in a fore to aft or side to side position within an aircraft and having a flange-like extension running longitudinally thereof and comprising counterbores 124, as discussed hereinabove, is shaped generally complementary to a sheet plug 130A/130B provided on the leg 126/bottom seat structure 46A/46B or wheels or casters 27E of an aircraft seat for positioning in mating association therewith.

In order to mate with this track member 120, a typical tack-engaging, locking, and/or braking means comprises a bolt, clamping member, control lever 128 as shown in FIG. 12B, and/or along with other advanced intelligent solutions, smart materials, electrical or advanced pneumatic trigger devices, connected to the upper body portion of tack member 120 or within an aircraft seat, wheels or casters 27E or aircraft interior for releasably and fixedly securing and connecting the mating association of sheer plug 130A/130B between a track member 120 and the leg 126/bottom seat structure 46A/46B or wheels or casters 27E of an aircraft seat.

Figure 17C:
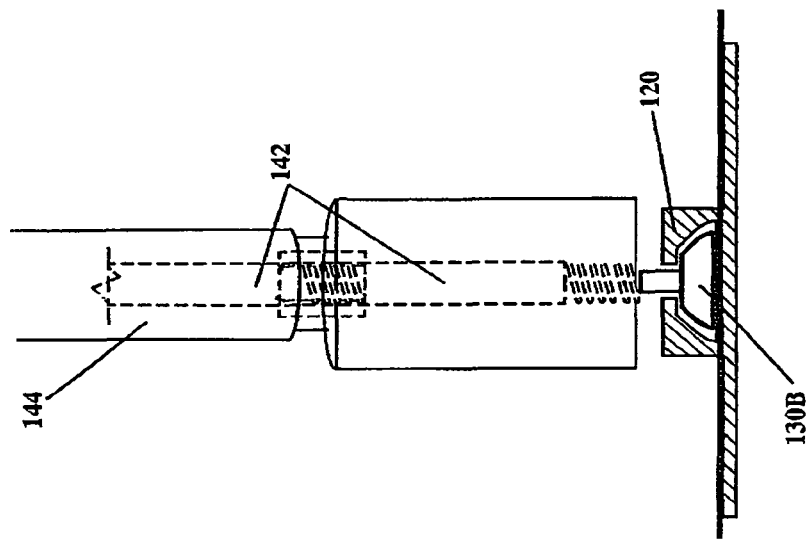
FIG. 17C shows a front view of an extended member from a handicapped accessible seat containing a spring-loaded or smart activated plunger with shear plug in a locked position.
Figure 17B:
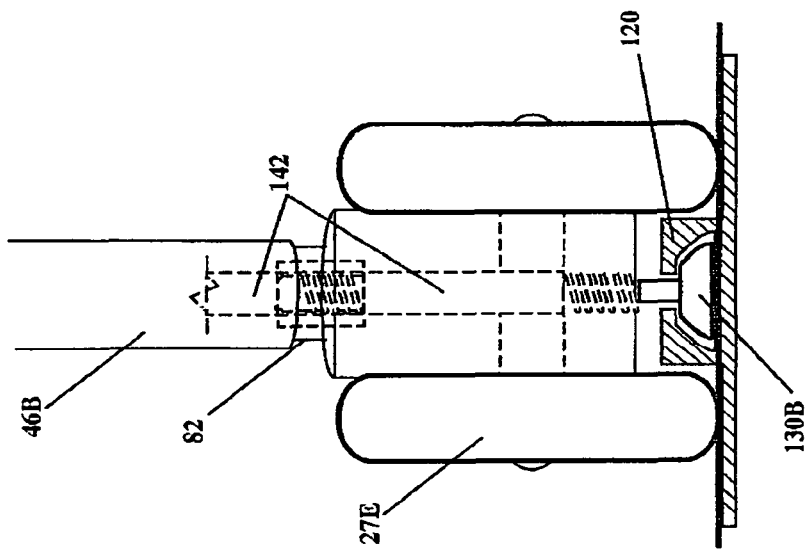
FIG. 17B shows a front view of a double wheel or caster containing a spring-loaded or smart activated plunger with shear plug in a fixed position.
Figure 17A:
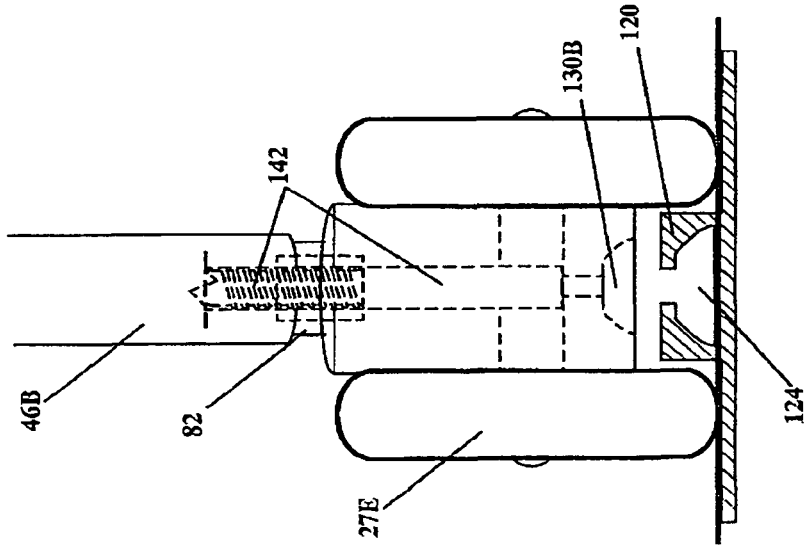
FIG. 17A shows a front view of a double wheel or caster containing a spring-loaded or smart activated plunger with a shear plug in a mobile position.

In these embodiments, the handicapped accessible aircraft seat 94 has a plunger assembly 142 featuring a self locating or preset spring loaded force and or along with other manual, or advanced intelligent activator solutions, smart materials, electrical or pneumatic triggers and connected to a shear plug 130B member located within wheels or casters 27E, as shown in FIGS. 17A and 17B, or within a protruding member of a seat bottom structure 46B, as shown in FIG. 17C, and corresponding to a track member 120

FIG. 17A shows a front section view of a plunger assembly 142 with a shear plug 130B in a mobile position, and mounted within wheels or casters 27E of a handicapped accessible seat 94, and corresponding to a counterbore 124 of track member 120. FIG. 17B shows a front section view of a plunger assembly 142 with a shear plug 130B in a locked position, and mounted within wheels or casters 27E of a handicapped accessible seat 94, and corresponding to a counterbore 124 of track member 120. FIG. 17C shows a front section view of a plunger assembly 142 with a shear plug 130B in a locked position, and located within a protruding member 144 mounted within the seat bottom structure 46B of a handicapped accessible seat 94.

Figure 14B:
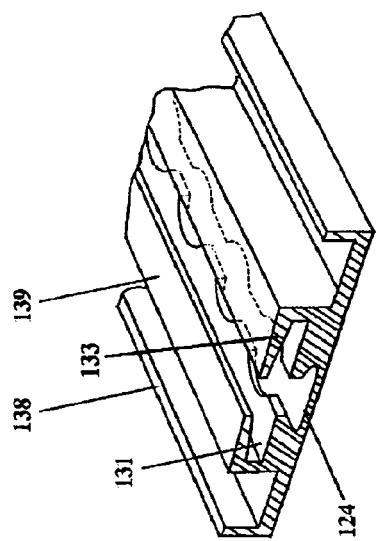
FIG. 14B is a 3-dimensional view of a seat track assembly containing round counter bores existing in periodic increments along the seat track, while containing a groove above and side flanges/grooves for guiding wheels or casters.

Any of these three embodiments may also implement a flange-like extension 138 along the bottom portion of the track to assist or guide wheels or casters 27E into a locking position as shown in track member 139, as shown in FIG. 14B fort illustration purposes with the track of FIG. 14A. Such an extension 138 could have a planar portion that is parallel to and sits along the floor of the aircraft, and over which the wheels or casters 27E roll along track 139. Extension 138 could also have an outer, upward portion, in the form of a bumper rail, that guides the wheels or casters 27E along the track and maintains their position within extension 138. Extension 138 may be useful in embodiments one, two, and three for a variety of purposes. Special activators or self-located devices/mechanisms could be integrated into the extension 138 (or wheel guide) to assist in the action of locking or docking. As another example, a track member 139 as shown in FIG. 14B for illustration purposes with the track of FIG. 14A, could run the entire length of an aircraft in a fore to aft direction, or in only specific portions thereof, and located in a manner in which it directs the path of travel for a handicapped accessible seat 94 down an aircraft aisle 100, while also allowing seat 94 to dock directly into its guiding member 138 located within track member 139.

Although it is preferred that maneuverability of the handicapped accessible aircraft seat 94 be maintained within simple parts or machines and mechanics to keep manufacturing costs to a minimum, the present invention may also implement advanced technologies including, but not limited to air-bearing or air casters (film technology), varying size/material implementation of wheels or casters 24E, pneumatic or electrical parts/mechanisms or brakes, hydraulics, and disc technologies. In summary, various attachments can be provided within the overall structure of the handicapped accessible seat as described by the present invention, such as an electric drive system to convert the handicapped accessible seat as shown in FIGS. 6A, 6B, 6C, 6D, and 6E into an electrically powered transport vehicle. Thus these new power-technologies may employ certain locking or braking mechanisms as described by the securement variations above.

In addition, various functional elements within the handicapped accessible aircraft seat, which relate to aesthetics may be translated in numerous ways, for example added handles or storage shelves or compartments, which may affect certain steps within the transfer process.

In the description of the handicapped accessible aircraft seat 94 or the method for transporting mobility impaired passengers into, out of, and within aircraft interiors, the terms "attachment mechanism," "braking mechanism" and "locking mechanism" may include: a latch, a pin, a washer, a hook, a bolt, a nut, a lock washer, a cotter pin, a rivet, a threaded fastener, or other fasteners or attachment mechanisms known in the art or as described above, coupled with automatic or physical acts such as moving a lever, pushing a button, or exerting a force.

One method for transporting mobility impaired passengers into, out of, and within aircraft interiors including the above mentioned embodiments may be accomplished by the following series of steps.

A mobility-impaired passenger arrives at the airport 56, and is transferred from the vehicle that brought them to airport into a personal wheelchair or assistive device 58 and/or standard airport wheelchair or power chair provided by the airport 62.

Prior to the time a handicapped passenger boards an aircraft 72 a flight attendant or passenger attendant walks into the aircraft interior 72, and retrieves a handicapped accessible seat 94 for the mobility impaired passenger, by disengaging the wheel braking mechanism and attachment mechanisms of the handicapped accessible seat as provided by the above system variations of the invention, thus detaching the handicapped accessible seat from a fuselage floor and fixed position.

After maneuvering 92A the handicapped accessible seat away from its stationary position within a row by pushing or pulling on a handle 22B or handlebar 42B (using handles or grips 86A and/or 86B if necessary), the flight attendant or passenger attendant would then push the accessible seat down the aisle of the aircraft, and proceed to the entrance door of the aircraft 90, and onto the sky bridge 68, or within the airport to retrieve the mobility impaired passenger.

After retracting necessary footrest 38B or foot rails 54, and moving armrests 24D to a position where they will not hinder the transfer, the passenger would then be lifted by a passenger attendant from his/her own personal assistive device or standard airport wheelchair into the handicapped accessible seat 71. While the passenger is seated in the handicapped accessible seat 94, the passenger attendant or flight attendant may then per form necessary adjustments, such as securing seat belts 36C and/or additional upper extremity belt restraints 31B, or adjusting a headrest 30C or seat back 48B, to ensure a safe transport into the aircraft interior.

Once the passenger 116 is secure, the flight attendant or passenger attendant 114 would then push and maneuver the handicapped accessible aircraft seat down the aircraft aisle(s) 102, and stop adjacent to (FIG. 8B) or behind (FIG. 8A) the seat's designated stationary position within the aircraft interior according to track member locations as shown in FIGS. 8A/11A/11B and 8B/11C/11D. The flight attendants or passenger attendant(s) can then proceed to maneuver the chair either laterally or forward, into its fixed position, again using handles or grips 86A and/or 86B if necessary.

Once the handicapped accessible aircraft seat reaches its designated stationary position, smart sensors, or the passenger attendant would then activate or engage all locking and braking mechanisms as provided by the above system variations of the invention, thus attaching the handicapped accessible seat to a tracking member and fuselage floor.

If a passenger requires use the lavatory while the aircraft is in-flight, the passenger, or the passenger attendant, would proceed in disengaging the wheel braking mechanism and attachment mechanisms of the handicapped accessible seat as provided by the above system variations of the invention, and maneuver in the same manner as described by the action of retrieving the seat above, however proceeding into a handicapped accessible lavatory 96, and subsequently transferring to the lavatory seat 72 (provided access to the lavatory is permitted according to the overall width 84 of the handicapped accessible seat). If an aircraft lavatory is not handicapped accessible as described by the invention, transfers 76 and 78 would be necessary, requiting the use of an in-flight wheelchair as shown in FIG. 4

Upon arriving at the passenger's destination, the entire transfer process of transfers 71, 62 and 58 would reverse after baggage handlers retrieve the passenger's personal mobility device from the cargo hold.

It will be apparent to those skilled in the art that changes and modifications may be made in the embodiments illustrated, without departing from the spirit and the scope of the invention. Thus, the invention is not to be limited to the particular forms herein shown and described except insofar as indicated by the scope of the appended claims.

The specific embodiments discussed herein are merely illustrative of specific manners in which to make and use the invention and are not to be interpreted as limiting the scope of the instant invention.

The invention claimed is:

1. A system for selectively securing and removing a wheelchair-bound individual to an aircraft, comprising:
    a wheelchair having a seat supported by a lower frame, said lower frame supported by rotatable rolling means that enable said wheelchair to be maneuvered from place to place within the aircraft with said individual in the seat,
    an elongated track assembly secured to the floor of said aircraft, said track assembly having rigid opposing sides defining a longitudinally extending open guideway therebetween and a pair of rigid retainer flanges overlying said guideway and arranged in spaced edge to edge relation to each other and defining an elongate keyway therebetween; and
    locking means on said wheelchair operatively arranged to lock said wheelchair to said track assembly, said locking means located within said rotatable rolling means, being selectively lockable by only the foot of a user, and comprising a locking pin sized to fit within said elongate keyway of the guideway, the locking means being engaged within the guideway to prevent movement of the wheelchair relative to said track.

2. The system of claim 1 wherein said wheelchair is configured to resemble surrounding aircraft seats and comprises a flotation cushion and seatbelt.

3. The system of claim 1 wherein said locking pin is constructed to engage firmly against the bottom of the track.

4. The system of claim 1 wherein said locking means comprises a compression spring anchored against said wheelchair and bearing downwardly on said locking pin.

5. The system of claim 1 wherein the flanges have a plurality of pairs of recesses in the edges thereof at regularly spaced intervals along the track, each pair of recesses being located directly opposite each other and cooperatively defining an enlarged access opening into the guideway, wherein said locking pin is sized to fit through said enlarged access opening into the guideway and can be removably inserted into one of the access openings of the guideway to prevent movement of the wheelchair relative to said track, and wherein said access opening in the track and said locking pin have complementary shapes for tight fitting therebetween.

6. The system of claim 5 wherein said track assembly further comprises a longitudinally extending upper keyway situated above said elongate guideway, said upper keyway defined by a pair of rigid opposing sides and at least partially overlaid by a pair of rigid retainer flanges arranged in spaced edge to edge relation to each other.

7. The system of claim 6 wherein said locking means is configured to allow said locking pin to lock within said upper keyway of said track assembly.

8. The system of claim 6 wherein said locking pin comprises an enlarged head being of dimensions larger than said access openings of the guideway to prevent insertion therein.

9. In combination,
    a wheelchair having a seat supported by a lower frame and rotatable rolling means that enable said wheelchair to be maneuvered from place to place within the aircraft, said wheelchair configured to resemble an aircraft seat and comprising a flotation cushion and seatbelt;
    an assembly for securing said wheelchair to an aircraft, comprising:
        an elongated track assembly secured to the floor of an aircraft, said track assembly having rigid opposing sides defining a longitudinally extending open guideway therebetween and a pair of rigid retainer flanges overlying said guideway and arranged in spaced edge to edge relation to each other; and
    locking means on said wheelchair operatively arranged to lock said wheelchair to said track assembly, said locking means being located within said rotatable rolling means, being selectively lockable by only the foot of a user, and comprising a locking pin sized to fit within said elongate keyway of the guideway, the locking means being engaged within the guideway to prevent movement of the wheelchair relative to said track.

10. The combination of claim 9 wherein said locking pin is constructed to engage firmly against the bottom of the track.

11. The combination of claim 9 wherein said locking means comprises a compression spring anchored against said wheelchair and bearing downwardly on said locking pin.

12. The combination of claim 9 wherein the flanges have a plurality of pairs of recesses in the edges thereof at regularly spaced intervals along the track, each pair of recesses being located directly opposite each other and cooperatively defining an enlarged access opening into the guideway, wherein said locking pin is sized to fit through said enlarged access opening into the guideway and can be removably inserted into one of the access openings of the guideway to prevent movement of the wheelchair relative to said track, and wherein said access opening in the track and said locking pin have complementary shapes for tight fitting therebetween.

13. A wheelchair capable of being secured within an aircraft, said aircraft having an elongated track assembly secured to the floor thereof, said track assembly having rigid opposing sides defining a longitudinally extending open guideway therebetween and a pair of rigid retainer flanges overlying said guideway and arranged in spaced edge to edge relation to each other, said wheelchair comprising:
    a seat supported by a lower frame,
    rotatable rolling means that enable said wheelchair to be maneuvered from place to place within the aircraft,
    said wheelchair being configured to resemble a standard aircraft seat and comprising a flotation cushion and seatbelt; and
    locking means located within said rotatable rolling means and operatively arranged to selectively lock said wheelchair to said track assembly using only the foot of a user, said locking means comprising a locking pin sized to be locked within said guideway of said track assembly to prevent movement of the wheelchair relative to said track.

14. The wheelchair of claim 13 wherein said locking means is constructed to engage firmly against the bottom of the track.

15. The wheelchair of claim 13 wherein said locking means comprises a compression spring anchored against said wheelchair and bearing downwardly on said locking pin.

16. The wheelchair of claim 13, wherein the flanges of said track assembly have a plurality of pairs of recesses in the edges thereof at regularly spaced intervals therealong, each pair of recesses being located directly opposite each other and cooperatively defining an enlarged access opening into the guideway, wherein said locking means further comprises a head at an end of said locking pin that is sized to fit through said enlarged access opening into the guideway and can be removably inserted into one of the access openings of the guideway to prevent movement of the wheelchair relative to said track.

17. The wheelchair of claim 16, wherein said head has a shape complementary to that of said access opening in the track for tight fitting therebetween.

18. The wheelchair of claim 16, wherein said track assembly further comprises a longitudinally extending upper keyway situated above said elongate guideway, said upper keyway defined by a pair of rigid opposing sides and at least partially overlaid by a pair of rigid retainer flanges arranged in spaced edge to edge relation to each other, wherein said locking means is configured to allow said locking pin to lock within said upper keyway of said track assembly.

* * * * *